Oct. 6, 1931.  R. H. HUTCHINSON  1,826,470
PIANO CARRIER
Filed April 2, 1929    3 Sheets-Sheet 1

Rutherford H. Hutchinson, Inventor

By Fenelon B. Brock, Attorney

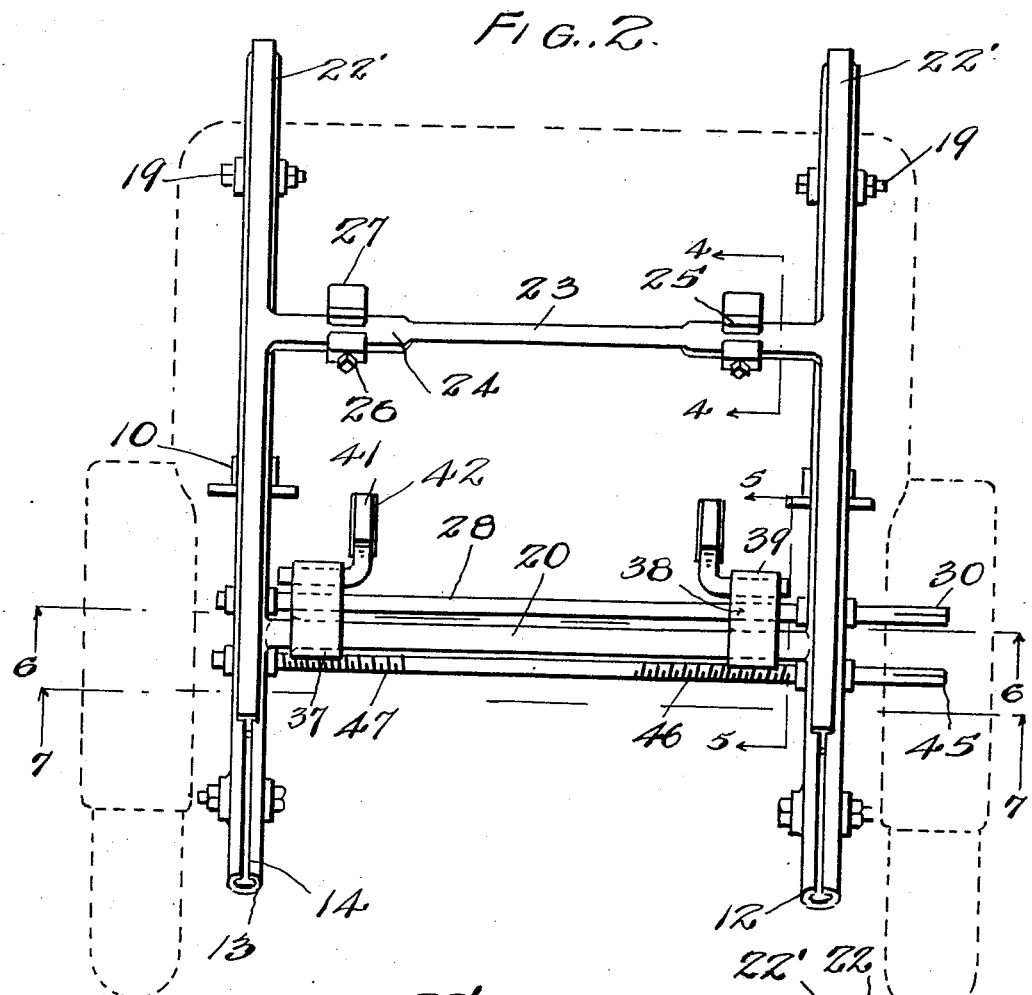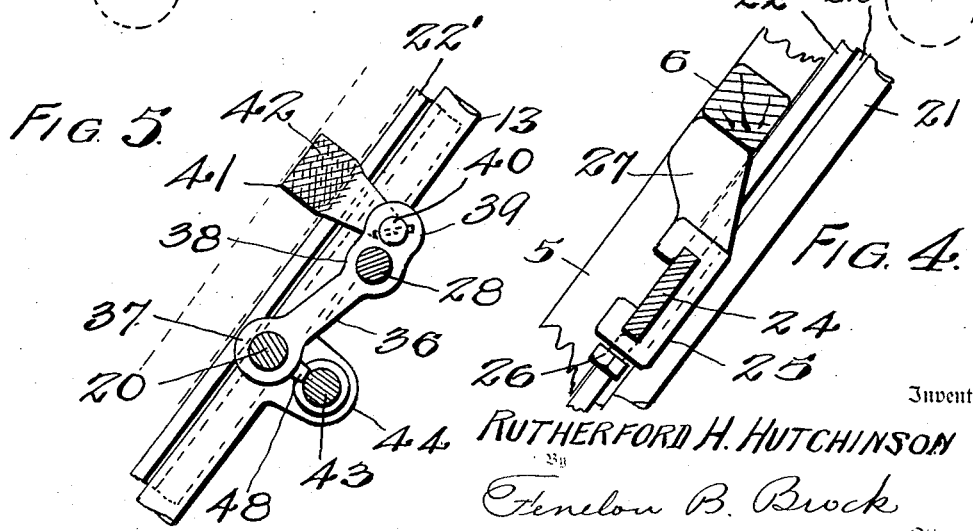

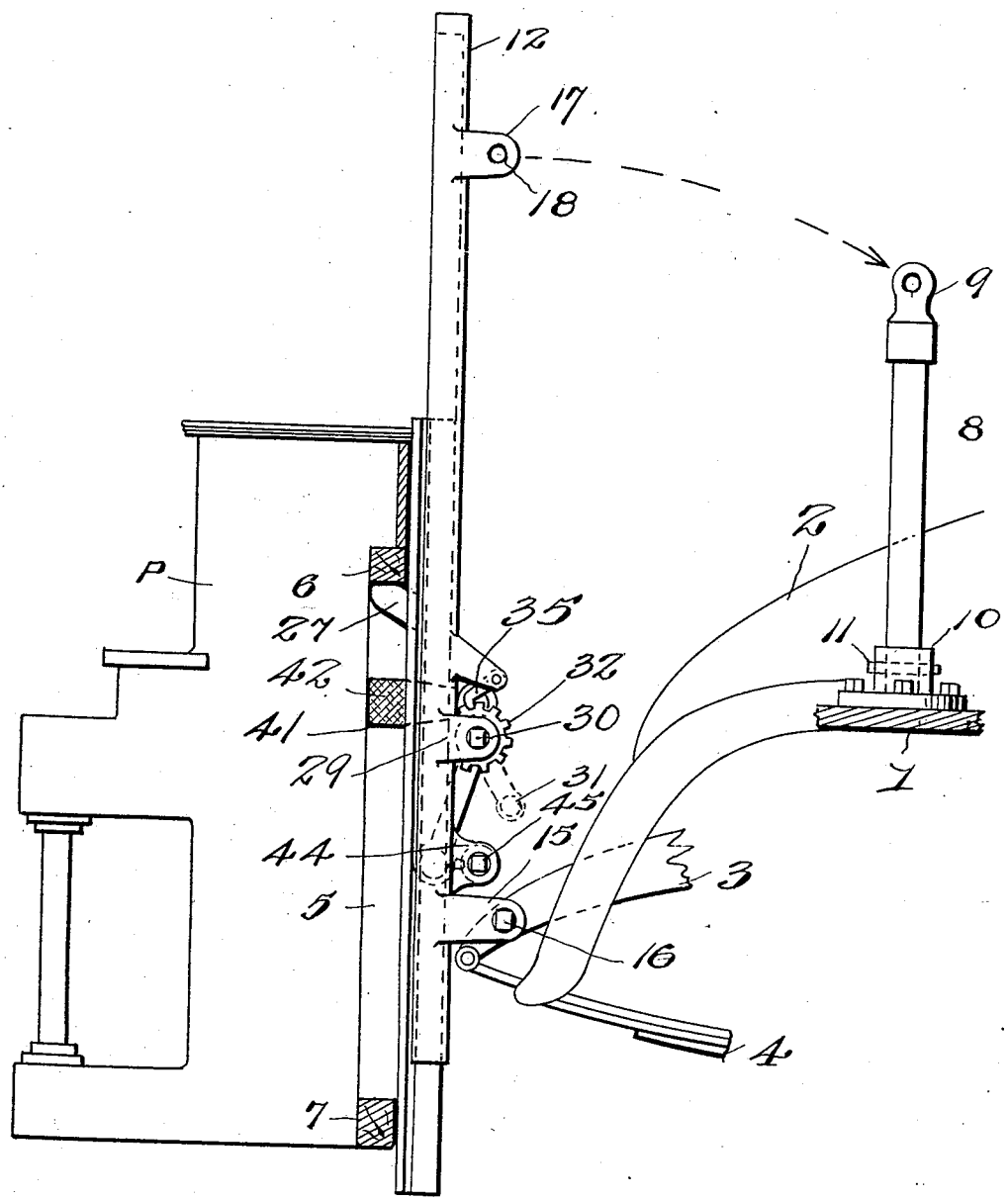

Patented Oct. 6, 1931

1,826,470

UNITED STATES PATENT OFFICE

RUTHERFORD H. HUTCHINSON, OF OGDEN, UTAH

PIANO CARRIER

Application filed April 2, 1929. Serial No. 351,919.

My invention relates to an improved piano carrier designed particularly for use as an attachment for automobiles of the coupé or roadster type. While the carrier may be adapted for carrying other loads, and also may be used with other types of vehicles, the invention is especially designed for carrying upright pianos and is especialy adapted for use with coupés and roadsters.

As is well known in the trade, pianos are usually carried in vans or heavy and large trucks, and the general cost of maintenance of these trucks or vans is very high and expensive. By the utilization of the device of my invention the cost of carrying or delivering a piano may be greatly reduced and the necessity for use of a van or truck is eliminated.

The primary object of my invention is the provision of a piano carrier that is used as an attachment for the coupé and which may with facility be attached to the passenger automobile, and with equal facility may be detached therefrom when not required for use. Thus the passenger automobile is readily converted for use as a freight carrier as well as for use as a passenger carrier.

In carrying out my invention I utilize a supporting frame that is hinged or pivoted at the rear of the automobile so that the frame may swing rearwardly to vertical position for receiving the load or piano, and then be tilted forwardly toward the car to transfer the weight of the load to additional supporting means carried by the car. In addition to the hinged supporting frame I utilize a relatively slidable carrier frame, together with means for raising and lowering the carrier frame. Means are also provided on the carrier frame for supporting the piano together with means for preventing lateral displacement of the piano when so supported.

In the accompanying drawings I have illustrated one complete example of the physical embodiment of my invention wherein the parts are combined and arranged according to one mode I have so far devised for the practical application of the principles of my invention.

Figure 2 is a view in elevation at the rear of the automobile which is shown in dotted lines, and the carrier is shown in full lines.

Figure 3 is a view in side elevation with some parts in section showing the piano on the vertically arranged carrier, and the latter is in position to be swung or tilted to supporting position on the coupé.

Figure 4 is a detail sectional view at line 4—4 of Figure 2.

Figure 5 is a detail sectional view at line 5—5 of Figure 2.

Figure 1:
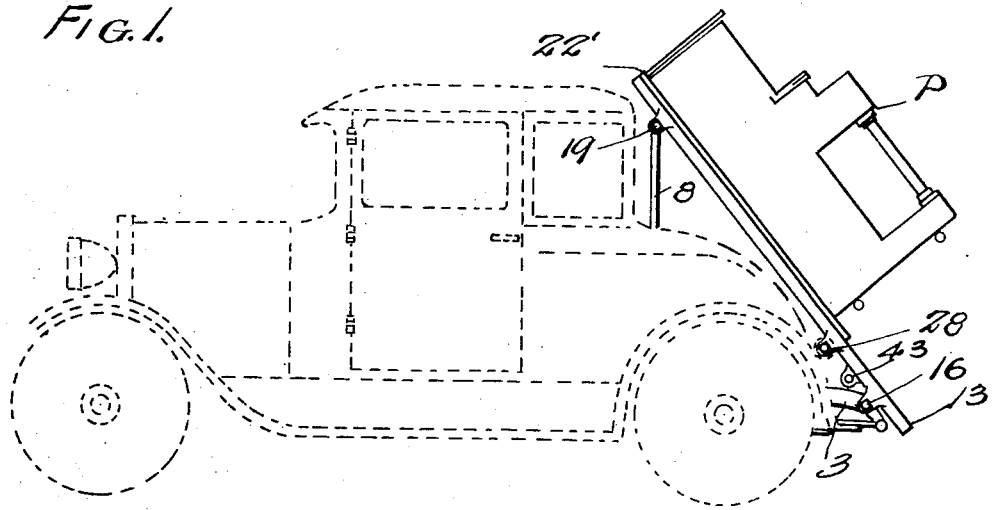
Figure 1 is a view in side elevation showing a coupé equipped with the piano carrier, and a piano supported thereon.
Figure 6:
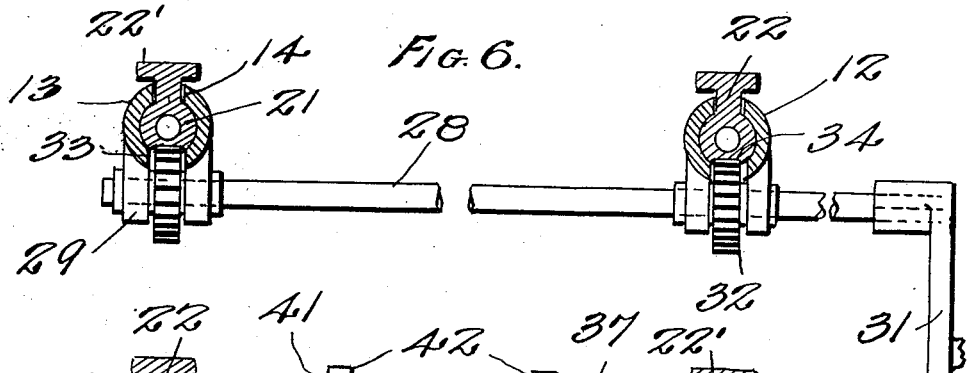
Figure 6 is a detail sectional view at line 6—6 of Figure 2.

In order that the general assembly and arrangement of parts may readily be understood, I have illustrated a coupé and indicated a part of its stationary supporting frame by the numeral 1. This supporting member is part of the car body 2 which, as here shown, is of the well known turtle-back type, or in some instances a rumble seat is arranged at the rear of the car. I have also designated a part of the chassis as 3 and the springs as 4.

The piano is indicated by the letter P and as shown is of the upright type.

The piano is carried by the carrier frame and it is supported on the frame in connection with its spaced vertical brace bars 5, the upper cross bar 6, and the lower cross bar 7 usually found at the rear of most upright pianos.

In converting the automobile for use as a freight carrier, I use a pair of upright posts 8 which are provided with perforated ears 9 at their upper ends. These posts are adapted to be inserted in sockets 10 that are permanently bolted to the stationary member 1 which may be any suitable portion of the body of the car. The posts are provided with transverse openings as are also the socket members 10, and cotter pins 11 are passed through these registered openings to retain the posts in their sockets. The posts are located near the opposite sides of the automobile and they project upwardly through holes that are made in the top of the turtle-back 2. The sockets 10 of course remain as permanent parts of the interior of the car body, but the two posts are attached when the car is to be used as a freight carrier, and detached from the car when the latter is to be used as a passenger car only.

The supporting frame which is attached to the automobile is of general rectangular shape and comprises a pair of parallel side bars 12 and 13 which are tubular and may be fashioned from pipes of suitable size and shape. Each tubular side bar is provided with a longitudinal slot 14 extending from end to end, and near the lower ends of the side bars they are each provided with a pair of shackles 15 which coact with the side bars 3 of the automobile chassis. These shackles or perforated lugs on the side bars are adapted to receive bolts 16 that pass through holes provided in the side bars 3 and also through holes in the ears or shackles 15 of the supporting frame. At the top of the supporting frame the side bars 12 and 13 are provided with ears 17 that are perforated at 18 and these perforations or holes are complementary to the holes at the tops of the posts 8. Thus as indicated in Figure 3 the supporting frame which is pivoted at 16 to the automobile frame may be swung as indicated by dotted lines to the right in Figure 3 and then the supporting frame is attached to the posts 8 by means of bolts 19 inserted through the ears of the supporting frame and the posts. The bolts 19 may be of suitable type, and an appropriate tool or wrench may be used for quickly securing the bolts or for detaching them.

Near the lower end of the supporting frame its tubular side bars 12 and 13 are joined by a tubular cross bar 20 which may be welded at its ends or otherwise rigidly secured to the side bars of the supporting frame.

On the supporting frame I mount a slidable carrier frame which comprises two slide rods 21 which may be tubular and are adapted to fit snugly within the side bars of the supporting frame and slide therein. The slide rods of the carrier frame are provided with keys 22 that travel in the slots 14 of the supporting frame. The slide rods also have exterior plates 22 integral with these keys and the plates 22 lie parallel with the side bars of the supporting frame and these plates are adapted to receive and support the rear face of the piano. A tie bar 23 joins these plates 22 and near the junction of the bar with the plates, the bar is fashioned with flat blades 24 that are rectangular in cross section. The carrier frame is thus of an H-shape and is slidable within the tubular side bars of the supporting frame.

On the blades 24 are mounted a pair of slide brackets 25 and set bolts 26 are carried by the brackets for holding the brackets in adjusted position on the blades 24. Each of the brackets has a head 27 projecting upwardly therefrom and this head which projects beyond the faces of the blades of the carrier frame is designed to support the piano under its upper cross bar 6, as best seen in Figure 4. Thus these bracket heads are adjusted equidistant from the center of the carrier frame, and of course the piano is arranged symmetrically so that the weight of the piano will be equalized. The bracket heads 27 are positioned between the vertical brace bars 5 at the rear of the piano and it will be apparent that these two bracket heads provide a stable support for the piano.

In Figure 3 the piano is shown supported on the carrier frame of the supporting frame and both of these members are in upright position to receive the load of the piano. The carrier frame has been lowered relative to the supporting frame in order that the piano may with convenience be supported upon the two bracket heads 27. After the piano is supported on the bracket heads the entire carrier and the piano are swung to the right as indicated by dotted lines in Figure 3, using the bolts 16 as hinges, and the carrier is bolted to the two posts 8.

After the carrier has been tilted and secured in tilted position, the carrier frame and the piano are elevated to the position indicated in Figure 1. For raising the carrier frame and piano I provide an operating shaft 28 which is journalled in bearings provided by pairs of perforated lugs 29 on the side bars of the supporting frame and this operating shaft is provided with a squared end 30 to receive a crank 31, indicated by dotted lines in Figure 3. The operating shaft extends transversely of the automobile and the squared end is located at the right hand side of the automobile and is readily accessible for manually operating the crank handle. Two spaced pinions 32 are carried by the operating shaft and these pinions project through slots 33 in the side bars 12 and 13 of the supporting frame and engage with the teeth 34 that are formed on the exterior of the slide rods 21 of the carrier frame. A pawl 35 is pivoted on the supporting frame to engage the rack pinions and hold the operating shaft against turning when desired. Thus the carrier frame may be elevated by turning the crank 31 and then when it has reached the desired position the carrier frame and piano are locked in that position by use of one or more pawls 35.

For the purpose of holding the piano against lateral displacement or movement transversely of the automobile, I provide the supporting frame with clamps that are adapted to engage the vertical spaced rear bars 5 of the piano. These clamps each comprise a holder 36 which is provided with a sleeve 37 slidable on the tubular cross bar 20 of the supporting frame and also a sleeve 38 that is slidable on the operating shaft 28. A boss 39 is provided on the sleeve 38 and in this boss an L-shaped clamp is pivoted. The L-shaped clamp has a round pin 40 that is journalled in the boss 39 and this pin is fashioned with a flattened angular clamp arm 41 which may be provided with a soft pad 42 for contact with the vertical bars 5 of the piano, and prevent marring the wood. These clamps are turned to inoperative position while the carrier frame is being elevated or lowered, and they are swung to operative position as indicated in Figure 5 and then they are adjusted laterally of the piano so that the clamp heads will engage spaced vertical bars 5 to hold the piano.

Figure 7:
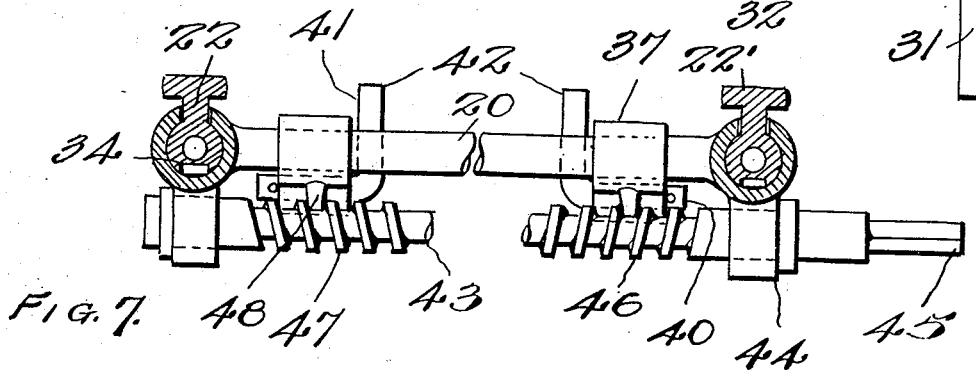
Figure 7 is a detail sectional view at line 7—7 of Figure 2.

The two holders are relatively movable and they are operated by the use of a transversely extending screw bar 43 which is journalled in bearings 44 and is provided with a squared end 45 adapted to receive the crank 31 so that the screw bar may manually be turned. The screw bar has a set of right hand threads 46 and a set of left hand threads 47 spaced apart as indicated in Figure 7, and with these threads a lug 48 (on the holders) engages. Thus it will be apparent that by turning the screw bar 43 the two clamp heads may be caused to frictionally engage a pair of spaced vertical bars 5 of the piano to hold the latter against lateral movement.

After the piano has rigidly been secured and, of course, the supporting frame has been secured, the piano is ready for transportation and may be carried in the tilted position indicated in Figure 1.

For unloading the piano the supporting frame is first released from the posts and then the piano may be swung around and delivered on an elevated platform. Or, if the piano is to be lowered to the ground, it is preferable that the piano and the carrier frame be lowered before the supporting frame is swung to upright position. In Figure 3 the piano is in position to be delivered or unloaded on a truck, and after the weight of the piano has been transferred to the truck, the carrier frame is lowered to withdraw the bracket heads from the piano, and, of course, the clamps are released and swung back to position as indicated in Figure 7, where they are free from the piano.

Having thus fully described my invention, what I claim and desire to secure by Letters Patent is:

1. The combination with a pivoted supporting frame having tubular slotted side bars of a carrier frame having rods slidable in said bars and supporting plates on said rods, of a rigid tie bar on the carrier frame, laterally adjustable bracket heads on said tie bar, and means for moving the carrier frame relatively to the supporting frame.

2. The combination with a supporting frame comprising a pair of slotted tubular side bars, of a slidable carrier frame and means for sliding said carrier frame, a pair of adjustable bracket heads mounted on the carrier frame, and set bolts therefor, a pair of adjustable clamp heads mounted on the supporting frame, a screw bar having right and left hand threads, and bosses coacting with the clamp heads and engaging said screw threads, for the purpose described.

RUTHERFORD H. HUTCHINSON.